June 3, 1930.  H. H. MOSS  1,760,955
JOINT FOR STRUCTURAL SHAPES AND METHOD OF MAKING THE SAME
Filed Dec. 24, 1925  2 Sheets-Sheet 1
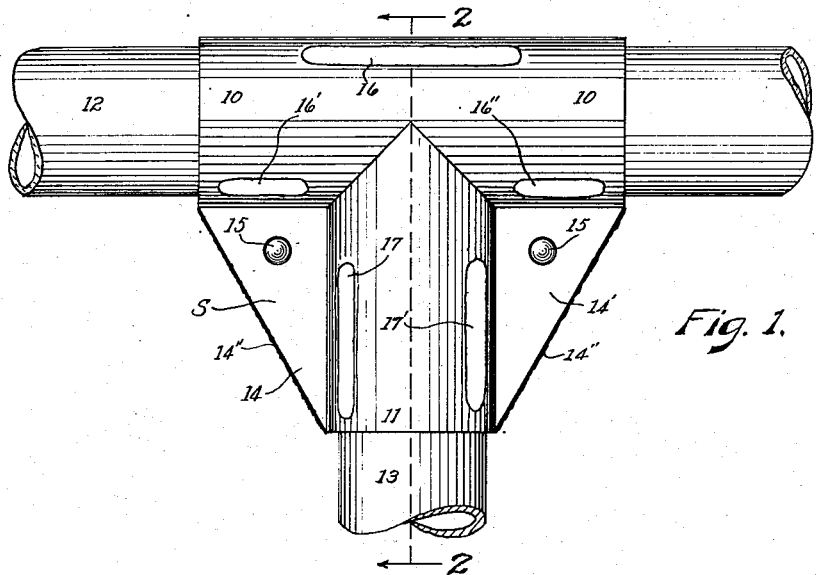
Fig. 1.
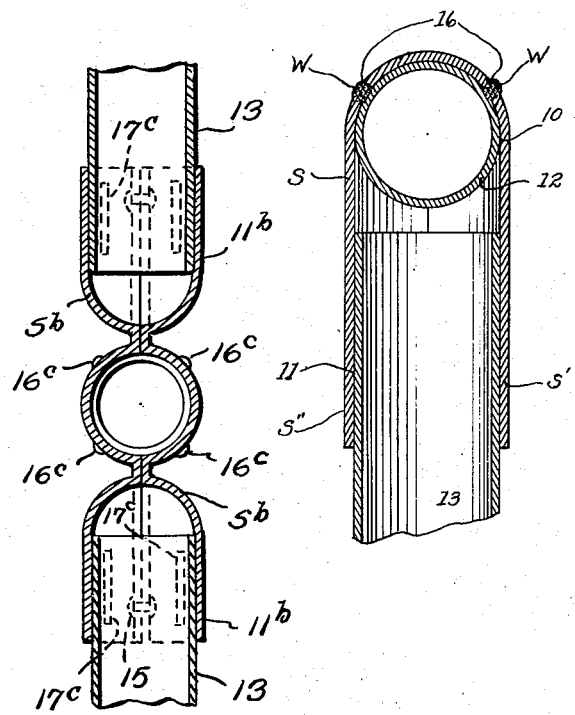
Fig. 2.
Fig. 5.
INVENTOR:
Herbert H. Moss,
BY
ATTORNEYS.

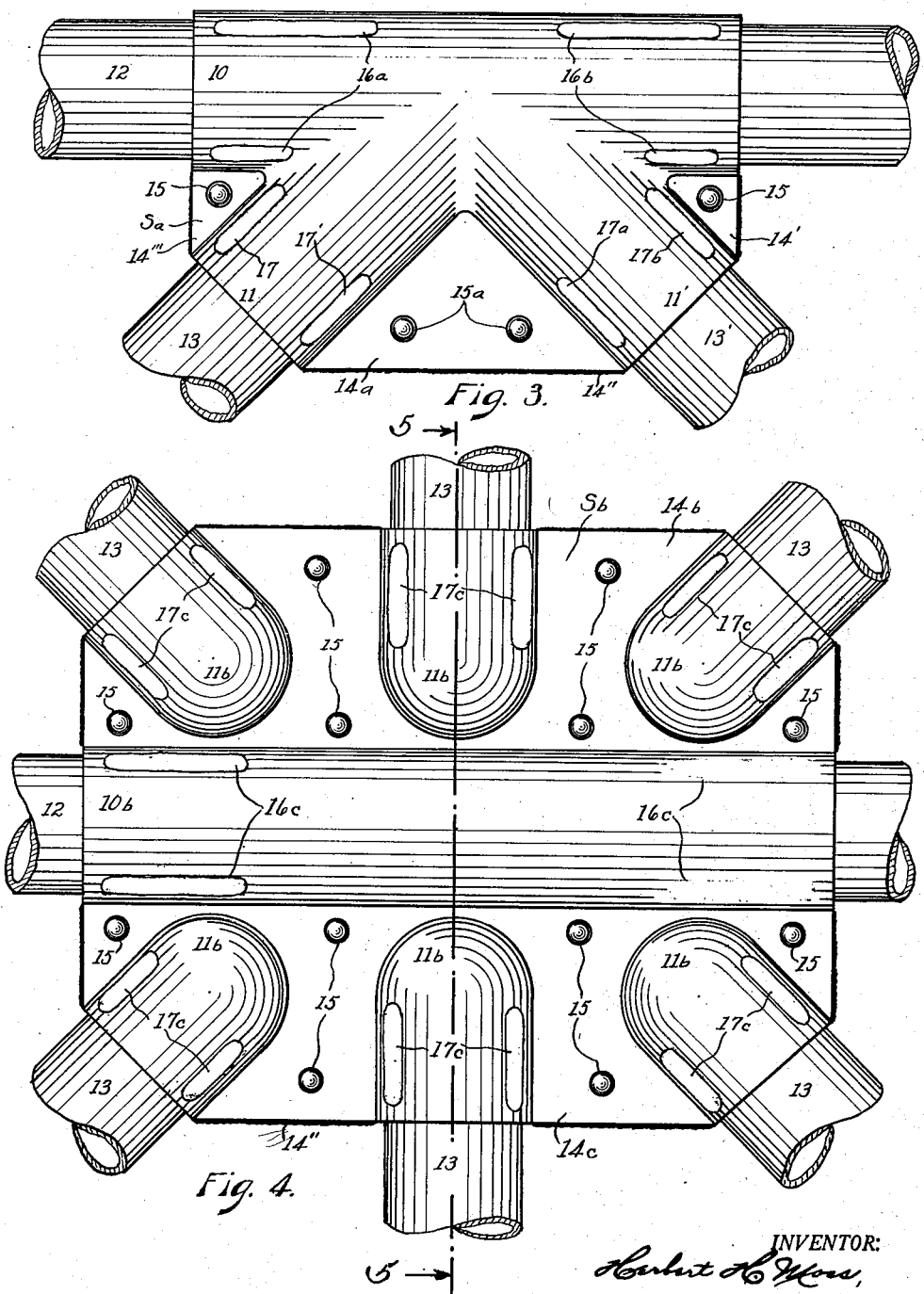

Patented June 3, 1930

1,760,955

UNITED STATES PATENT OFFICE

HERBERT H. MOSS, OF BELLEVILLE, NEW JERSEY, ASSIGNOR TO THE LINDE AIR PRODUCTS COMPANY, A CORPORATION OF OHIO

JOINT FOR STRUCTURAL SHAPES AND METHOD OF MAKING THE SAME

Application filed December 24, 1925. Serial No. 77,611.

This invention relates to an improved method of and means for joining structural shapes, and more particularly to the joining of tubular shapes by employing welds made by high-temperature heating agents such as the oxy-acetylene flame, the electric arc, and the like.

Heretofore, the practice of joining tubular structural members has been to abut the ends of the members with mitre or other types of conforming cuts and bevels to obtain a neat junction. Then, by a more or less difficult manipulation of the welding torch or arc a series of welds are made at the joint thus formed. In such methods acute angles are usually produced between some members, making welding extremely difficult. Proper penetration, if obtained, is secured at the expense of time and material. Compounding of welds is a common occurrence and as a result high residual stresses exist in the finished structure. Where welding accessibility is improved by mechanical means, eccentricity is introduced in the joint.

These and other factors heretofore encountered have been instrumental in retarding the more general utilization of welded tubular structures, and it is the principal purpose of this invention to remove these and other obstructions which prevent the economical use of tubular construction in the structural field.

More specifically, some of the objects of this invention are to provide a joint which may be easily assembled; is self-supporting while being welded; holds all members in a predetermined symmetrical or concentric position; may be easily and quickly welded; and is neater in appearance and stronger than those heretofore made. These objects are accomplished by employing neatly formed, close-fitting connection members or housings which are constructed beforehand and have sockets to receive and firmly grip the joined members and web metal between such sockets in a plane coincident with the longitudinal center lines of the members and sockets; by having the welded surfaces accessible instead of being located in acute angles or corners, and by avoiding the weakening circumferential welds.

Other specific objects are to provide a joint which may be standardized like pipe fittings; one in which the welds are not compounded, and which has adequate non-rigid metal around the welds and connecting the various members. These objects are accomplished by using joint fittings or housings which may be of a standard size and shape and by using axial instead of circumferential welds.

Further objects are to provide a joint which does not require cutting the joined members to an exact length and shape and will take tubular members having walls of varying thickness. This is accomplished by providing sockets to receive the joined members instead of requiring such members to accurately and closely fit one another as heretofore.

The above and other objects and the novel features of this invention will be more clearly understood from the following description and by referring to the accompanying illustrations, in which:

Fig. 1 is a view of an improved joint as constructed according to this invention to join the end of one tubular member to the side of another;

Fig. 2 is a sectional view of the joint shown in Fig. 1, taken along line 2—2;

Figs. 3 and 4 are views of improved joints constructed to join the ends of two tubular members and six tubular members, respectively, to the sides of a single tubular member.

Fig. 5 is a sectional view along line 5—5 of Fig. 4.

Generally speaking, an improved joint according to this invention comprises a series of web plates adjoined to one or more sockets or cylindrical ways having intersecting axes and arranged to provide housings or terminal receptacles into which or through which one or more tubular shapes may be inserted or passed. Securement of members in such sockets or ways may be accomplished by making fillet welds or preferably by depositing a welded or brazed key or rivet through holes or slots in the sockets and ways onto the members in the latter, whereby such keys or rivets of weld metal are fused to the housing and members and form an integral part of the metal of both the housing and the members joined thereby. Two members telescopically fitting one another may be similarly united by providing holes in the outer member which will expose portions of the inserted part of the inner member, and into which holes weld metal may be fused so as to provide weld unions between the edges of such holes and such exposed portions.

While the housing or connection member may be made of pressed or machined plates, or cast, and of ferrous as well as non-ferrous metal; for practical applications it is preferably and most economically made of pressed plate steel, in either one or more parts, depending upon the nature of the joint to be formed. For use in ordinary truss construction, the housing may be made from a single substantially rectangular plate which, after having the half-sockets or indentations formed or pressed therein, is folded centrally about a mandrel or along a center line so that such indentations face and register with one another to provide complete sockets, ways or recesses to house parts of the several members to be joined. Where folding the plate about a mandrel or along a line may not be resorted to due to the design of the housing, the halves may be made separately. In both cases, the halves may be secured together laterally by welding their edges together and/or by spot welding, riveting or bolting at proper points. Ample web metal is left in the housing between the sockets and in the plane coincident with the longitudinal center lines of the members joined, so that the joint will be concentric or symmetrical with said plane.

The dimensions and contours of the housings depend upon the number of members to be joined, the stresses transposed from one member to another, and the external shape and size of the members to be housed. The size and dimensions of the holes or slots in the socket walls, which receive the fused weld metal, depend upon the amount of strength to be transposed from the members to the housings, or vice-versa, and the factor of safety determined to govern the strength of the joint. Said slots or holes may be varied, as by enlarging them with the aid of an oxy-acetylene cutting torch, to compensate for heavier than standard tubular shapes, since it is possible to use extra heavy and double extra heavy pipe in the same socket because the outside diameters of these various weights usually correspond to the outside diameter of standard pipe.

Referring to Figs. 1 and 2, as shown, the housing S is formed from a single plate of sheet steel that is folded or doubled over a cylindrical or other appropriately shaped mandrel to form a way or socket 10; such plate also having corresponding complementary indentations pressed into one face which register to form a socket 11 disposed at an angle to the through socket 10. A main structural member, such as the tube or pipe 12, telescopes tightly into and extends through the socket or way 10; and the end of a substructural member, such as the tube or pipe 13, is telescoped or inserted into the socket 11 to tightly fit the latter. The plate forming the housing S is desirably so cut that flat portions or webs 14, 14' are provided in the sections S', S'' on opposite sides of the indentations forming the socket 11. These webs 14, 14' are adapted to abut face to face, and registering holes 15 are desirably provided in the abutting webs so that bolts may be inserted therein to clamp them together to tightly hold the members 12 and 13 during assembly and welding. Subsequently, the bolts may be removed and the holes 15 filled with rivets or weld metal, and the coincident lateral edges of the webs may be welded or brazed together, as at 14''. These webs are an important feature of this joint since they provide stiffening means between the sockets and members and in a plane with the axes of the latter, thus avoiding eccentricity in the joint.

The tubular or cylindrical members 12 and 13 are permanently secured in the sockets or recesses 10 and 11 by deposits of weld metal fused to the members and to the edges of and portions adjoining the holes in the housing S, to integrally unite such members to the housing and to one another. A substantial quantity of weld metal is preferably employed to form the welds and is deposited by fusing suitable metallic material or welding rod by high-temperature heating means, such as an oxy-acetylene flame or an electric arc, or in accordance with the high-temperature brazing method disclosed in U. S. Patent No. 1,620,324 granted March 8, 1927 upon an application Serial No. 709,690 filed in the name of Glenn O. Carter. The term "weld" or "welding" as herein employed comprises these and equivalent fusion means which may be employed.

In the joint shown, the housing is initially provided with suitable holes or slots, preferably formed by punching them out when the indentations are pressed into the plates, or otherwise. The holes or slots open into the sockets at a substantial distance back from the ends of the sockets to leave solid metal along the outer edges of the sockets. The holes expose portions of the structural members inserted in the sockets. As shown, the socket 10 has three slots 16, 16', 16'' in each side, the slots 16', 16'' being substantially in line, while the slot 16 is staggered relatively to the other two and substantially bridges the space between them, the four lines of slots being substantially equally spaced circumferentially of the tubular member 12. The socket 11 has two slots 17, 17' in each half thereof and on opposite sides of its center line. The slots are all elongated and extend lengthwise of the axis of the socket into which they open.

After assembling the structural members therein, the several slots are filled with weld metal W, deposited by an oxy-acetylene blowpipe, electric arc, or equivalent high-temperature heating means, thereby integrally uniting the edges of the slots to the exposed portions of the members and welding the component parts securely together. In some types of joints, fillet welds may be applied circumferentially between the outer edges of the sockets and the adjoining parts of the members therein. The weld metal may consist of steel, iron, the so-called bronzes, or other suitable metal.

The size, position and shape of the slots or openings may be varied according to the strength desired in the welded joint, and the place in which it is designed to be used. The provision of slots as here disclosed is of great practical importance, since the designer of a given joint is thereby enabled to predetermine the amount of weld metal to be deposited to obtain a given strength. The amount of welding is therefore not left to the judgment of the welder in the field and, by inspecting his work, it is easy to determine whether sufficient weld metal has been deposited to fill the joint to obtain the predetermined strength that is desired. Moreover, by locating the slots back from the end of the socket the native metal of the socket completely surrounds the weld metal on all sides.

The construction of the housing Sa and joint shown in Fig. 3 is substantially similar in principle to that shown in Figs. 1 and 2, but is designed to receive two radial sub-members 13, 13' instead of one. As in Fig. 1, the housing Sa comprises a single plate of sheet steel doubled upon itself, the joined tubular members are designated as 12, 13, 13', and their sockets as 10, 11, 11', respectively. The webs are indicated at 14', 14''', with a similar one at 14$^a$ intermediate the sockets 11 and 11'; while bolt or rivet holes 15 are placed in the webs 14', 14''' and two similar holes 15$^a$ may be placed in the web 14$^a$. The welding slots or openings 16$^a$, 16$^b$ may be formed in pairs in opposite walls of the housing, and slots 17, 17' and 17$^a$, 17$^b$ corresponding to the slots 17, 17' of Fig. 1 are formed in sockets 11, 11'. All of these slots are filled with weld metal, in the manner already described.

Fig. 4 illustrates another embodiment of this invention. The housing S$b$ thereof, instead of being formed of one piece of sheet metal doubled upon itself, comprises two separate stamped and formed plates of sheet metal which are desirably alike with their complementary sides abutting face to face at the webs thereof to form a complete socket 10$^b$ for the central portion of the tube 12 which extends therethrough, and one or more radial sockets 11$^b$ on opposite sides of the socket 10$^b$ to receive the ends of tubular members 13. As shown in this view, the sockets 11$^b$ do not open into the socket 10$^b$ but are formed so as to be closed at the bottom end. The sockets 11, 11' in Figs. 1, 2 and 3 may, of course, be similarly formed, or the socket 11$^b$ may cross the socket 10$^b$ and two separate members may be inserted into opposite ends of the same socket. Webs 14$^b$ and 14$^c$ abut face to face in the complementary plates and have holes 15 for bolts or rivets. The bolts in the holes 15 in each form of joint may be permanently secured in place by welding them to the housings or, if desired, truss rods may be welded or otherwise secured into the holes 15.

It will be apparent that the improved joints may be designed to connect a large number of separate members which may radiate in any direction, and such members may be of different size and shape, either hollow or solid. The improved construction combines facility for concentric termination of members, placement of ample web metal between sockets and in the plane coincident with the longitudinal center line of the members joined, sufficient metal for transposition of stresses, adequate non-rigid metal where welds occur, economy of material and labor, standardization, simplicity in fabrication of the housing and field assembly, and ease of assimilation in practical structures.

While the improved joints are shown and described in considerable detail, it will be understood that certain features herein may be employed without others, as in joining two members which telescopically fit one into the other; and various changes may be made in the details disclosed without departing from the principles of the invention or sacrificing the advantages thereof.

I claim:

1. For use in joints, a connecting housing comprising a single metal plate folded upon itself to provide complementary sections, the metal adjacent such fold being formed so as to provide a through socket or way to receive a main member, and each section having one or more indentations separated by webs, the indentations of one section being adapted to face those of the other section to provide sockets to receive ends of sub members, all sockets having holes through their walls adjacent to said webs adapted to receive fused metal to unite said members to said housing, and said webs having holes adapted to receive means for securing them together symmetrical with a plane through the axes of said sockets.

2. A structural joint comprising a pressed metal connection member comprising a single metal plate folded upon itself and having sockets formed therein and having webs extending between said sockets, said sockets having longitudinal slots through their walls parallel to the axes thereof and adjacent to the plane of said webs, said sockets adapted to receive therein structural members to be joined and fitting into said sockets and having a surface opposite said slots, and weld metal filling said slots and uniting said structural members and said connection member.

3. A method of making a metal structural joint comprising pressing indentations in a single sheet of metal to provide complementary socket portions and leaving portions adjacent to said socket portions unindented to provide webs; slotting the socket portions adjacent to the unindented portions of the sheet parallel to the line of the indentations; folding the pressed sheet so that the indented portions are positioned opposite each other to form sockets; inserting structural members into said sockets; pressing said sockets against said members and depositing weld metal in said slots to unite the pressed sheet and the structural members.

4. A welded joint comprising a housing having sockets and webs between such sockets symmetrical with a plane through the axes of the sockets, said sockets having holes through the walls thereof located adjacent to the junctions of said webs and said sockets at a distance back from the entrance of said sockets; structural members having portions inserted in said sockets, and weld metal filling said holes and uniting said structural members to said housing.

5. A welded joint comprising a housing having sockets and webs between such sockets symmetrical with a plane through the axes of the sockets, said sockets having holes through the walls thereof, said holes consisting of elongated slots closed at their ends and extending parallel to the axes of the respective sockets close to the lines of junction of said sockets and said webs, structural members having portions inserted in said sockets, and weld metal filling said holes and unitting said structural members to said housing.

In testimony whereof I affix my signature.

HERBERT H. MOSS.